US011063890B2

(12) United States Patent
Bastide et al.

(10) Patent No.: US 11,063,890 B2
(45) Date of Patent: *Jul. 13, 2021

(54) TECHNOLOGY FOR MULTI-RECIPIENT ELECTRONIC MESSAGE MODIFICATION BASED ON RECIPIENT SUBSET

(71) Applicant: International Business Machines Corporation, Armonk, NY (US)

(72) Inventors: Paul R. Bastide, Boxford, MA (US); Liam Harpur, Dublin (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/574,187

(22) Filed: Sep. 18, 2019

(65) Prior Publication Data

US 2020/0014644 A1    Jan. 9, 2020

Related U.S. Application Data

(63) Continuation of application No. 15/884,248, filed on Jan. 30, 2018, now Pat. No. 10,574,608, which is a (Continued)

(51) Int. Cl.
H04L 12/58    (2006.01)

(52) U.S. Cl.
CPC ............ *H04L 51/10* (2013.01); *H04L 51/046* (2013.01); *H04L 51/063* (2013.01); *H04L 51/32* (2013.01)

(58) Field of Classification Search
CPC ..... H04L 51/10; H04L 51/046; H04L 51/063; H04L 51/32
See application file for complete search history.

(56) References Cited

U.S. PATENT DOCUMENTS 7,933,960 B2    4/2011   Chen
8,463,595 B1    6/2013   Rehling
(Continued)

FOREIGN PATENT DOCUMENTS

WO    2016066228 A1    5/2016

OTHER PUBLICATIONS

Neri et al, "Sentiment Analysis on Social Media", IEEE, 2012.
(Continued)

*Primary Examiner* — Philip J Chea
*Assistant Examiner* — Robert B McAdams
(74) *Attorney, Agent, or Firm* — Anthony V. S. England; L. Jeffrey Kelly; Susan M. Maze (57) ABSTRACT

A computer system implemented method detects that a sender is composing a message designated for delivery to recipients via a computer network. A recipient is selected as an early recipient based on records of reactions associated with historical records for past messages of the recipients. Prior to sending the message, the computer system finds a historical record of the early recipient that matches a portion of the message and presents the sender with a reaction indication based on a record of reaction associated with the historical record of the early recipient that matches the message portion. The computer system receives a modification from the sender for the message portion and generates a modified message by applying the modification to the message. The computer system sends the message to all the recipients, including sending the modified message portion after applying the received modification to the message portion.

20 Claims, 4 Drawing Sheets

Related U.S. Application Data continuation of application No. 15/592,186, filed on May 10, 2017, now Pat. No. 10,484,320.

(56) References Cited

U.S. PATENT DOCUMENTS

| | | | |
|---|---|---|---|
| 8,849,826 B2 | 9/2014 | Minh | |
| 8,965,835 B2 | 2/2015 | Avner | |
| 9,485,212 B1 | 11/2016 | Bastide | |
| 9,928,462 B2* | 3/2018 | Lee | A61B 5/165 |
| 2007/0100603 A1 | 5/2007 | Warner | |
| 2008/0096533 A1 | 4/2008 | Manfred | |
| 2009/0319342 A1 | 12/2009 | Shilman | |
| 2011/0300884 A1 | 12/2011 | Ollila | |
| 2014/0052684 A1 | 2/2014 | Liao | |
| 2014/0115078 A1* | 4/2014 | Bhatia | H04L 51/02 709/206 |
| 2016/0147731 A1 | 5/2016 | Parikh | |
| 2018/0331989 A1 | 11/2018 | Bastide | |
| 2018/0331990 A1 | 11/2018 | Bastide | |

OTHER PUBLICATIONS

Vryniotis, Vasilis, "How to build your own Facebook Sentiment Analysis Tool," Feb. 3, 2014, Datumbox, http://blog.datumbox.com/how-to-build-your-own-facebook-sentiment-analysis-tool/.

List of IBM Patents or Patent Applications Treated as Related.

Paul R. Bastide, et al. "Technology for Multi-Recipient Electronic Message Modification Based on Recipient Subset" U.S. Appl. No. 15/592,186, filed May 10, 2017. A Copy Is Not Provided Herein, Since This Application Is Internally Available to the Examiner.

Paul R. Bastide, et al. "Technology for Multi-Recipient Electronic Message Modification Based on Recipient Subset" U.S. Appl. No. 15/884,248, filed Jan. 30, 2018. A Copy Is Not Provided Herein, Since This Application Is Internally Available to the Examiner.

* cited by examiner

TECHNOLOGY FOR MULTI-RECIPIENT ELECTRONIC MESSAGE MODIFICATION BASED ON RECIPIENT SUBSET

BACKGROUND

Online social networks, such as Twitter and Facebook, provide universal mechanisms to connect people and information in logical and organized ways, as do network communications via email. These networks enable the users to rapidly share, gather and process information by messaging and posting via interfaces including inboxes, walls, activity streams, timelines and profiles, for example. (Herein, unless explicitly indicated otherwise, "or" is intended to include "and." For example, to "message or post" may be to message in one instance, to post in one instance and to message and post in another instance. Further, the term "messaging" may be used to include texting, chatting, posting and email messaging.)

SUMMARY

In an embodiment of the present invention, a computer system implemented method for multi-recipient message modification includes detecting, by the computer system, that a sender is composing a current message, wherein the current message is designated for delivery via a computer network to recipients once the current message is completed. The computer system selects a particular one of the recipients as an early recipient based on records of reactions associated with historical records for past messages of the recipients and finds, prior to sending the current message to the recipients other than the early recipient, a historical record of the early recipient that matches a portion of the current message. Prior to the computer system sending the current message to the recipients other than the early recipient, the sender is presented with a reaction indication based on a record of reaction associated with the historical record of the early recipient that matches the current message portion. After the computer system presents the indication to the sender and prior to the computer system sending the current message to the recipients other than the early recipient, the computer system receives a modification from the sender for the current message portion. The computer system generates a modified message portion by applying the received modification to the current message portion prior to the computer system sending the current message to the recipients other than the early recipient and sends the current message to all the recipients, wherein the sending of the current message to all the recipients includes sending the modified message portion and occurs after applying the received modification to the current message portion.

In other embodiments of the invention, other forms are provided, including a system and a computer program product.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

The technology disclosed herein is configured to operate on messages of an online social network, according to an embodiment of the present invention, such as, for example, Twitter, Facebook, IBM Connections, Jive and Yammer. According to another embodiment of the present invention, the technology disclosed herein is configured to operate on messages of a messaging system, such as, for example, Outlook, Gmail and Lotus Notes.

Embodiments of the present invention recognize that messages, such as messages in email and social networks, for example, may evoke different sentiments in different people and that a person composing a message may not be fully aware of how recipients will react to the message. For example, a message that uses the word "tolerance" may feel outdated to some readers who now prefer to say "acceptance." Further, for some readers "tolerance" may even evoke negative sentiments, perhaps because to them mere tolerance implies begrudging acceptance. Consequently, embodiments of the present invention provide real-time, message composition features for an email and social network user. That is, while a sender is composing an email or social network message, a process executing on a computer system provides information to the sender about sentiment the message will evoke among one or more recipients of the message, according to an embodiment of the present invention.

By presenting sentiment information, the computer system process prompts the sender to change the message before sending it. In addition to presenting sentiment information about words or phrases the sender composes, the computer system process may explicitly prompt the sender to change the message, which may include presenting suggested changes to words or phrases the sender initially composes.

Further, according to at least one embodiment of the present invention, the computer system process obtains the sentiment information it presents the sender by detecting a first recipient's reaction to at least a first portion of the message before the process sends the portion to others of the recipients. The earlier, first recipient is a user who is known to be expressive (referred to herein as an "expressive user" or "expressive recipient"), according to an embodiment of the present invention.

Figure 1:
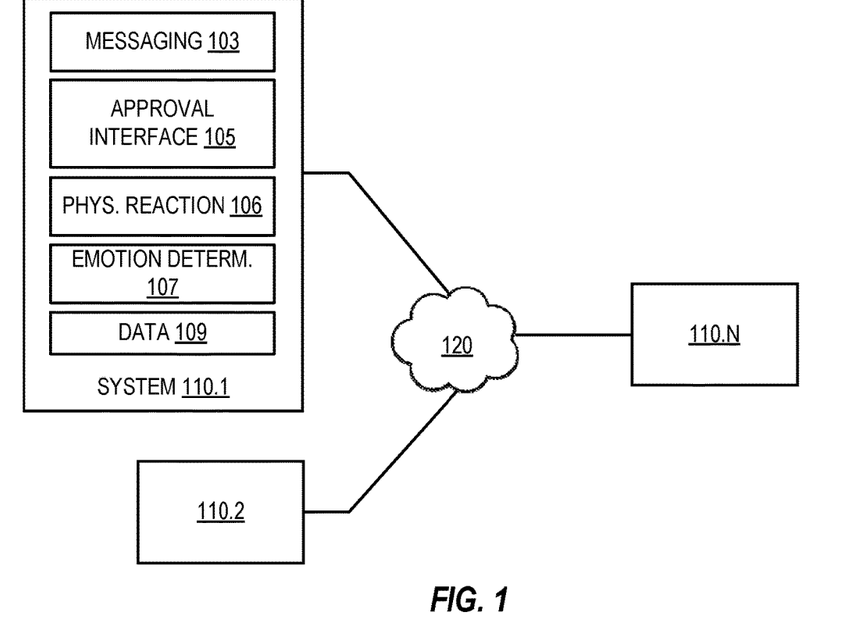
FIG. 1 illustrates a networked computer environment, according to embodiments of the present invention.

FIG. 1 illustrates an example computing environment 100, according to embodiments of the present invention. (For each illustrated element that is numbered in the Figures herein, the first digit of the element number corresponds to the Figure in which the element appears. Consequently, each numbered element may be unambiguously referred to herein by its element number alone, i.e., without also reciting the Figure number.) As shown, computing environment 100 includes computer systems 110.1, 110.2 through 110.N interconnected via network 120, which may be public or private. Systems 110.1, 110.2, etc. include data and application modules. (According to embodiments of the present invention, modules may be combined and may be part of the same application, of course.)

As an illustrative example, system 110.1 may be a server system having a messaging module 103, an approval interface module 105 configured for communicating with a process of messaging module 103 for modifying a message responsive to a reaction of a selected recipient prior to sending the completed message to all recipients, a physical reaction module 106 that is configured for capturing the reaction, e.g., images and sounds of the selected recipient recorded as the user read, heard or saw the message, and emotion determination module 107 that is configured for receiving the captured reaction as a query and returning a resulting emotion determination, i.e., an emotion that the user had to the message as indicated in the images recording, sound recording, or both, so that a process of module 105 can prompt a change to the message. Also illustrated in system 110.1 is data 109, which may include a historical record of messages and results of historic emotion determinations made in connection with past messages.

Data 109 and modules such as 103, 105, 106 and 107 may be distributed among systems 110.1, 110.2, etc., or may all be included on each system 110.1, 110.2, etc. For example, in one embodiment of the present invention, modules 103 and 105 may be on a user's client system, which may be system 110.1 in an embodiment, while physical reaction module 106 and emotion determination module 107 may be on one or more others of systems 110.2 through 110.N. For example, physical reaction module 106 may be on a client computer system 110.2 of the selected message recipient, while emotion determination module 107 may be on the message recipient's client system 110.2 or another one of the systems 110.N, such as a server that is remote from systems 110.1 and 110.2. Data 109 may be on one or more of systems 110.1 through 110.N.

Emotion determination module 107 may also monitor messaging and associated physical responses via the above described processes on an ongoing basis for users on network 120, analyze the physical responses to determine emotions that arise for respective recipients, and collect and store as data 109 associations of the emotions of the respective recipients with words and phrases of the messages, so that module 107 may use data 109 to predict reactions of respective recipients to words and phrases of future messages based on the text of the words and phrases and the recipient, without the images or sounds.

Figure 2:
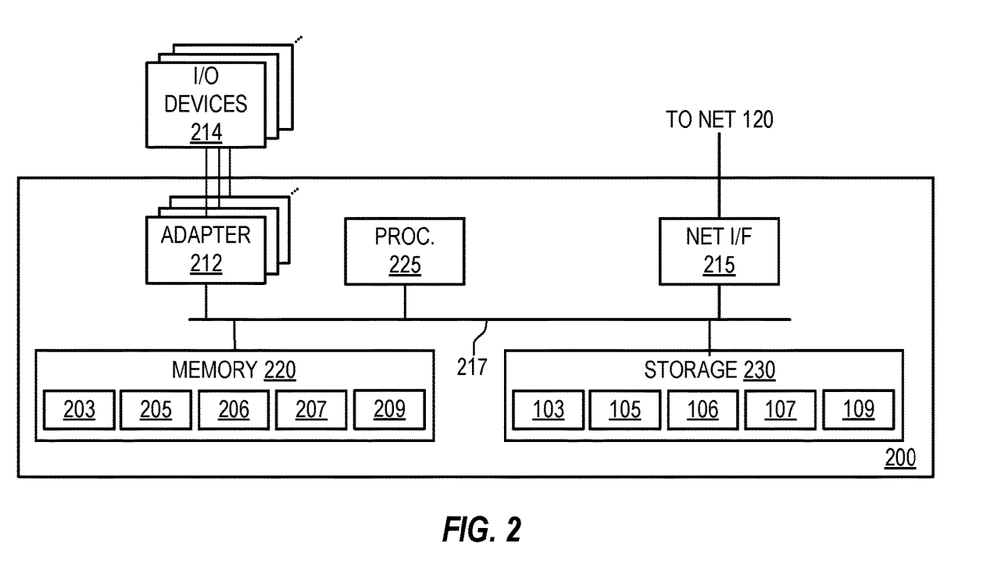
FIG. 2 is a block diagram of devices shown in FIG. 1, according to embodiments of the present invention.

FIG. 2 illustrates a high level view of a computer system 200 suitable as computer systems 110.1, 110.2, etc. of FIG. 1, according to embodiments of the present invention, wherein system 200 includes at least one central processing unit (CPU) 225, network interface 215, interconnect (i.e., bus) 217, memory 220 and storage device 230. CPU 225 may retrieve and execute programming instructions stored in memory 220. Similarly, CPU 225 may retrieve and store application data residing in memory 220. Interconnect 217 may facilitate transmission, such as of programming instructions and application data, among CPU 225, storage 230, network interface 215, and memory 220. CPU 225 is representative of a single CPU, multiple CPUs, a single CPU having multiple processing cores, and the like. Additionally, memory 220 is representative of a random access memory, which includes data and program modules for run-time execution, according to embodiments of the present invention.

Module 103 in storage 230 is a source for a running process 203 in memory 220. Likewise, with module 105 and process 205, module 106 and process 206, and module 107 and process 207. Likewise, data 109 in storage 230 may provide a run-time data instance 209 in memory 220. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

An operating system runs on processing unit 225. The operating system coordinates and provides control of various components within data processing system 200 in FIG. 2. As a client, the operating system may be a commercially available operating system such as Microsoft Windows 10. An object-oriented programming system, such as the Java programming system, may run in conjunction with the operating system and provides calls to the operating system from Java programs or applications executing on data processing system 200. Illustrative of a client system for a user, FIG. 2 indicates that a system 200 includes adapters 212 connecting bus 217 to input/output devices 214, such as a keyboard, a mouse, a camera, a speaker and a microphone, for example. Each such I/O device 214 may have its own hardware or program module (not shown) for communicating with data 209 and one or more of the modules 203, 205, etc.

As a server, data processing system 200 may be, for example, an IBM Power System server or the like, running the Advanced Interactive Executive (AIX) operating system or the LINUX operating system. These are just two examples of many possible systems. Data processing system 200 may be a symmetric multiprocessor (SMP) system including a plurality of processors in processing unit 205. Alternatively, a single processor system may be employed.

In some embodiments, some or all mechanisms thereof may be implemented as application specific hardware, firmware, or the like. Likewise, mechanisms may be application software stored in a storage device and loaded into memory for execution by one or more hardware processors. As such, the computing device 200 shown in FIG. 2 becomes specifically configured to implement the mechanisms of the illustrative embodiments and specifically configured to perform operations described herein.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The above-described examples and depictions in the Figures are not meant to imply architectural limitations.

Further, embodiments of the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

Figure 4:
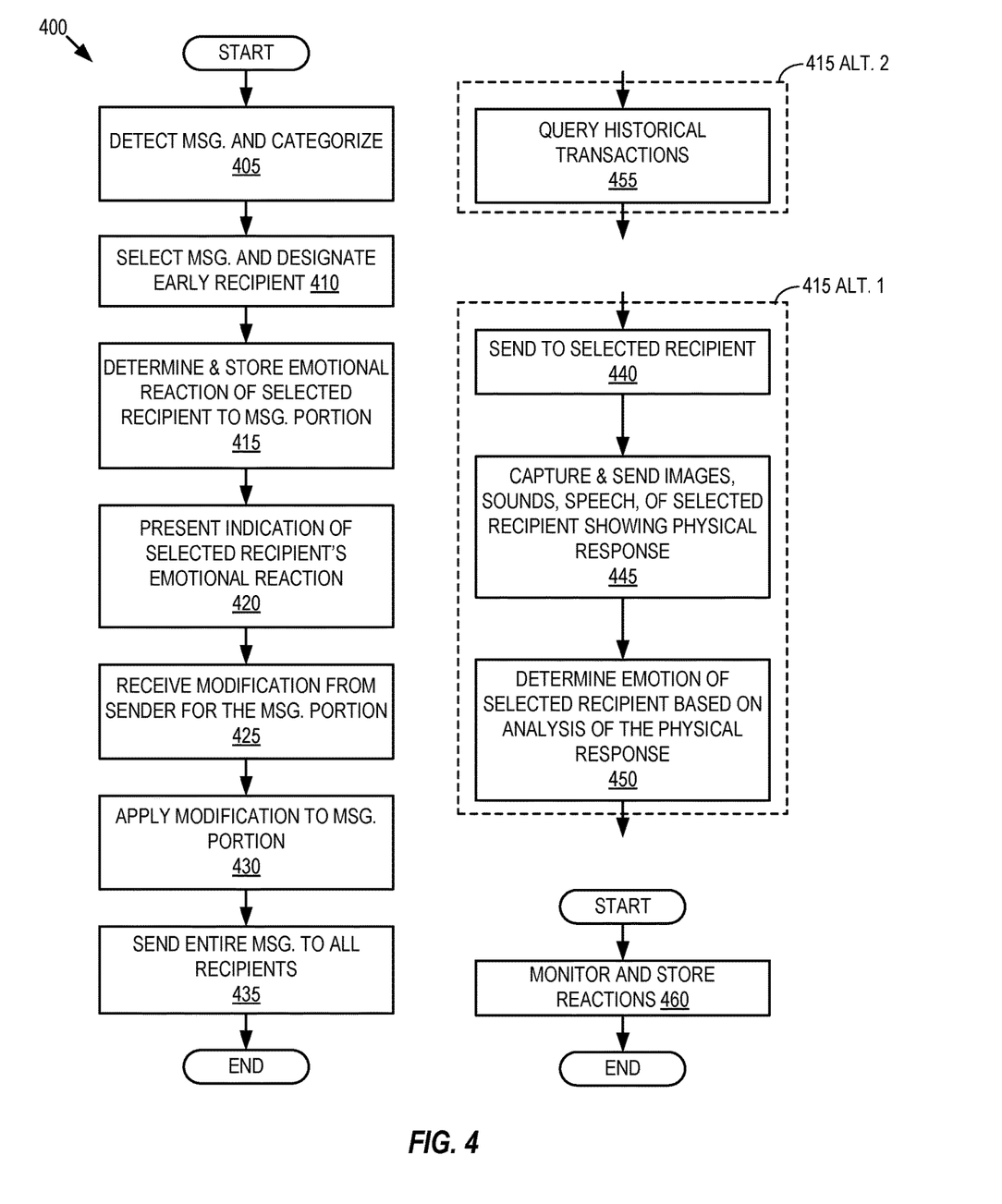
FIG. 4 illustrates information exchange and signaling, according to embodiments of the present invention.

While the user is composing the message, such as by process 203 of module 103 on system 110.2 in FIG. 2, according to at least one embodiment of the present invention, a process executing on the computer system, such as process 205 of module 105 in FIG. 2, detects the composing and sends the message in portions, progressively, while the message is still being composed, such that earlier portions of the message are sent to at least one recipient (the earlier recipient(s)) before sending the portion to other recipient(s), which may include sending one or more portions before the sender has even composed later portions of the message. (Sending the message in portions, progressively, i.e., progressive sending, may also be referred to as "phased" sending.) The flow chart of FIG. 4 illustrates the detecting 405 and progressive sending 4440, where progressive sending 440 is an aspect of one way 415, Alternative 1, of determining 415 an emotional reaction of the earlier recipient, according to an embodiment of the present invention.

With regard to detecting and sending an earlier portion of the message before the user has composed a later portion, portions detected and sent may be single words in one embodiment of the present invention. In other embodiments, the portions may be groups of words. For example, there may be a fixed number of words in each portion. Alternatively, process 205 may detect 405 ongoing composition and may send whatever words are composed in respective, predetermined time intervals. Alternatively, the words in a portion may be determined by process 205 on the computer system detecting 405 punctuation in the message, such as commas and periods, where process 205 sends 440 a group of words delimited by a comma or a period as a single portion, for example.

When a new message is created, or is about to be created, an event occurs, which may be one or more of a push event, a pull event and a user interface (UI) event, for example. For a UI event, computer system process 205 may detect an event in which composition of a message is initiated via the UI and may also detect composition of text, character by character, which may include activation of a menu or graphical object with an input device, such as a mouse, keyboard, touch screen, microphone, etc. Process 205 may be automatically inline to message creation, may be activated via the above mentioned actions and may be associated with one or more UI elements configured for initiating message creation and for creating text.

An example of a push event includes an event where content (a message) is published to a subscriber, whereupon the subscriber may act on the message. Publishing may include updating an already existing draft, which may or may not have been published before. In this context, process 205 may detect the publication event via an application programming interface (API). Gnip API and Compliance API are API's commonly used for this.

An example of a pull event includes an event where a message list in the form of a feed is updated with an entry to indicate a new message. This may include updating an already existing, draft message. Hootsuite, Twitter Feeds and IBM Connections OpenSocial Activity Stream each provide ways to detect this kind of event. In this context, process 205 may monitor for an entry added to the feed.

Further, in at least one embodiment of the present invention the computer system processes perform functions described herein, i.e., progressive sending (or progressive comparison), sentiment analysis, suggestions, etc., on only selected messages. In order to select messages for performing certain functions, process 205 categorizes each message by extracting content from the message and analyzing the content, as shown at 405, according to an embodiment of the present invention. This may identify a topic, for example, such as by grammatical analysis. In one aspect, extracting content may be facilitated by process 205 identifying text associated with specific symbols like "?," "@" and "#." For example, process 205 may be configured to select 410 a message when the message contains a specific keyword or a specific symbol. Process 205 may be configured to select 410 a message when the message contains a specific keyword associated with a symbol, such as @mention and #hashtag, for example. Process 205 may be configured to select 410 a message when it contains a specific combination of keywords or symbols, or when it contains a specific combination of keywords and symbols.

Also, a message may have an associated status, such as high importance, confidential, or the like. In another type of status, a message may be promotional, such as a paid for message. According to at least one embodiment of the present invention, process 205 selects 410 at least some types of messages, regardless of their content, based on status. For example, process 205 may be configured to select 410 messages, regardless of their content, if the messages have the following status categories: confidential, urgent, important, and NOT promotional. Alternatively, process 205 selects 410 at least some types of messages based on a combination of status and content. According to at least one embodiment of the present invention, process 205 does NOT select at least some types of messages based on status unless their message content satisfies certain criterion. For example, process 205 may be configured to NOT select messages unless their message content satisfies certain criterion if the messages have at least one of the following status categories: normal and promotional.

In at least one embodiment of the present invention, computer system processes perform functions described herein, i.e., progressive sending (or progressive comparison), sentiment analysis, suggestions, etc., on messages subsequent to a first message on which the processes initially do so. That is, after the processes perform progressive sending (or progressive comparison), sentiment analysis, suggestions, etc., on an initial message from a particular sender that is intended for a particular set of target recipients, the computer system processes perform the same functions again using the same expressive recipient on subsequent messages that are in the same session and that are sent by the same sender to the same set, or to any of the target recipients of the set. The subsequent messages may be messages in a chat session, replies related to an initial email message or private message in a social network (e.g., a thread), or comments on a social network posting, for example.

Figure 3:
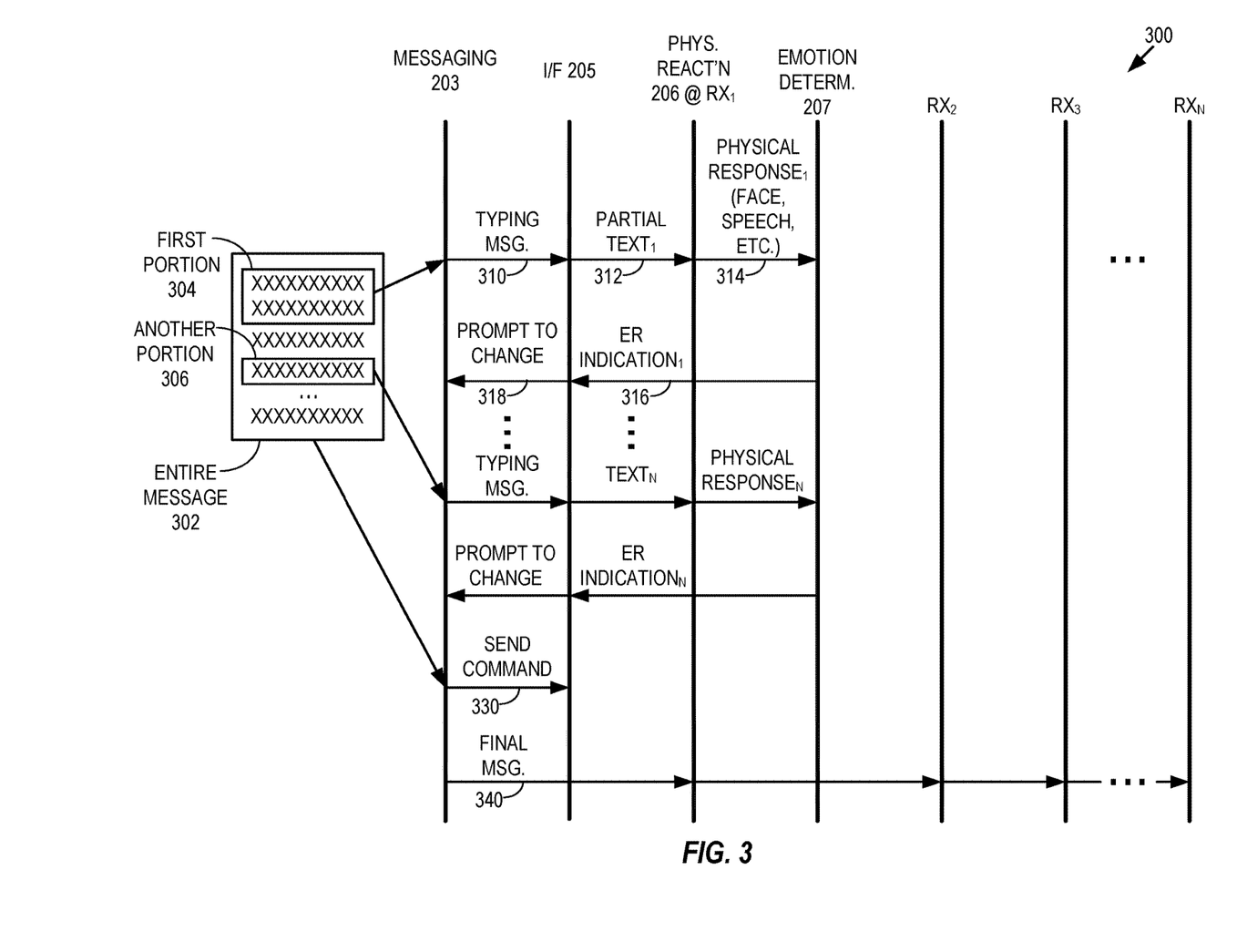
FIG. 3 illustrates, in flow charts, actions performed by one or more computer system processes, according to embodiments of the present invention.

For an embodiment of the present invention where a computer system process sends 440 a first, preliminary portion of the message to an earlier recipient before sending 435 the completed, finalized message to all the message recipients, one or more processes executing on the computer system may determine 415 a reaction of the earlier recipient to the first portion while the sender is still composing the message, i.e., before the message is sent 435 to the other recipient(s). This is illustrated in FIGS. 3 and 4, where typing of message 302 portion 304 is detected 310 and 405, and portion 304 is sent 312 and 440 to the selected, earlier recipient RX1 before the complete message 302 is sent 340 and 435 in response to a send command 330 to all recipients RX1, RX2, RX3 through RXN. Likewise, the processes executing on computer system(s) may determine a reaction of the earlier recipient RX1 to each successive portion. that is sent to the earlier recipient while the sender is still in an initial stage of composing message 302. One such successive portion is illustrated in FIG. 3 as portion 306. Alternatively, the computer system processes may determine one or more reactions of the earlier recipient RX1 more near to the time when the sender has completed all the portions and is about to send the completed message to the other recipients. In another alternative, the computer system may determine a reaction of the earlier recipient to one or more portions sent to the earlier recipient while the sender is still in an initial stage of composing the message and one or more other portions more near to the time when the sender has completed all the portions and is about to send the completed message to the other recipients.

Regardless of the alternatives, process 205 may automatically notify 318 and 420 the sender about the detected reaction 316 of earlier recipient RX1 to message portion 304, when process 205 receives notification 316 that process 207 has detected the one or more words have caused an adverse reaction in earlier recipient RX1. Notification 318 and 420 may include prompting the sender to change message portion 304 in order to obtain a more nearly optimal reaction from the message recipients RX1, RX2, etc., as described herein below regarding suggestions by process 205 and sender selections of the suggestions, for example. In one way to determine a reaction of earlier recipient RX1 to portion 304 of message 302, a process 206, which may be executing on the earlier recipient's computer system, for example, detects 314 and 445 physical cues of earlier recipient RX1 that occur as earlier recipient RX1 reads the message portion 304, which may include detecting facial expression of recipient RX1, which may include eye movement or other movement, such as head movement and shoulder movement and may include combinations of movements. In connection with detecting 314 the cues, process 206 sends 314 and 445 one or more records of the detected cues to emotion determination process 207 as a query. For example, earlier recipient RX1 may respond to reading message portion 304 by looking upward, frowning or shaking his/her head left and right. Emotion detection process 207 may be configured with a model such that this type of eye movement (looking upward), mouth movement (frowning) or head movement (shaking left and right) is associated with a negative reaction, so that when process 206 queries 314 and 445 process 207 with images from a camera of the computer system of user RX1 indicating this type of movement by earlier recipient RX1 when reading message portion 304, emotion detection process 207 signals 316 and 450 the sender's computer system process 205, which may be on the sender's computer system, for example, that earlier recipient RX1 has responded negatively to message portion 304. In another example, earlier recipient RX1 may respond to reading message portion 304 by smiling, laughing or nodding. Process 207 may be configured such that its model associates this type of mouth movement (smiling or laughing) or head movement (nodding) with a positive reaction, so that when process 207 receives a query 314 and 445 of images from a camera of the computer system of user RX1 indicating this type of movement by earlier recipient RX1 when reading message portion 304, process 207 responsively signals 316 and 450 process 205 that earlier recipient RX1 has exhibited a positive reaction to message portion 304. More generally, process 206 captures 314 and 445 images of the face, etc. of recipient RX1 and emotion detection process 207 analyzes 316 and 450 those images to detect sentiment therefrom. One or more commercial applications may be applied for at least the emotion detection function, such as, for example, Emotient, Affectiva, EmoVu, Nviso, Kairos, Project Oxford by Microsoft, Face Reader by Noldus, Sightcorp, SkyBiometry, Face++, Imotions, CrowdEmotion and FacioMetrics.

Emotion detection process 207 may also be configured to receive audio input captured 314 and 445 by process 206 from a microphone of the earlier recipient's computer system, so that process 207 may detect 316 and 450 sentiment based on reactions by expressive user RX1 in a real time, audible dialog or monolog, i.e., in response to user RX1 reading a written message portion 304, such as in a chat session, for example. Process 207 may be configured to associate audible laughing with a positive reaction, for example. Earlier recipient RX1 may also speak to another person or to himself/herself in response to the received message portion 304, in which case process 207 may determine sentiment from the audible speech of user RX1 sent as query 314. Accordingly, process 207 analyzes audible speech of query 314 to determine sentiment from prosody as well as from linguistic content. The prosody analysis may include analysis of pitch, pitch contour, loudness, energy contour, timbre, speech rate, shortening/lengthening of words, and pauses between words. One or more commercial applications may be applied for this function, such as, for example, Good Vibrations, EmoSpeech, EmoVoice, Audeering, and Vokaturi. Process 207 may also perform conversion of speech to plain text via speech recognition, such as via the commercially available IBM Watson Speech to Text application, so that process 207 may perform linguistic analysis on the plain text of audible speech in query 314 and 445. Linguistic analysis may include analysis of parts of speech and word characteristics, such as word length, proportion of word fragments and repetition. It may include unigram determinations, such as the word "bad" means anger, the word "okay" means neutral, etc. One or more commercial applications may be applied for this linguistic analysis function, such as, for example, IBM Watson, Receptiviti, AlchemyAPI, Bitext, Mood Patrol, Synesketch, Tone API and Repustate API.

It should be appreciated from the foregoing that in one or more embodiments of the present invention the earlier recipient does not intentionally collaborate with the sender to give the sender a reaction to the partial message. Rather, the earlier recipient may be unaware that he/she is receiving the message earlier than other recipients in this particular instance and may be unaware that his/her reaction is being fed back to the sender in this particular instance, although the computer system process of the earlier recipient may be configured to require that the earlier recipient has first provided input indicating he/she has explicitly agreed in advance to this reaction feedback arrangement, or else the computer system process will not send the earlier recipient's reaction back to the sender.

As stated herein above, emotion detection process 207 may be configured with a model for determining sentiment. The model may determine sentiment according to aspects that include group dynamics, sharing, topic sensitivity, word sensitivity, demography, repetition, time frame, and individual response, such as, for example, expressiveness, facial expression and sounds made by an individual. These and other aspects may be combined to determine sentiment according to predetermined weights for each aspect.

According to an embodiment of the present invention, In order to facilitate mining 455 of past reactions and also to provide an audit trail, approval interface process 205 stores 415 records of words and phrases of progressive sending and corresponding emotions of respective earlier recipients detected in response to particular words and phrases, where process 205 stores the words and phrases of a message portion 304 and associated emotion (also referred to as "sentiment") when process 205 receives an emotion indication 316 in FIG. 3, for example. Also, a computer system process such, which may be on a server rather than a user's computer system, may monitor and store 460 records of sentiments of a message recipient that the computer system process detects or receives notice of in response to the recipient encountering particular words and phrases in messages irrespective of whether the messages are sent progressively or sent to the recipient earlier than to other recipients. This may include sentiments in reaction to not only written messages, but also to spoken messages, such as in audio and video chat sessions and even telephone calls. For example, an approval interface process 205 on a computer system, such as the computer system of a message recipient or on a remote system communicating with the computer system of the message recipient, may detect sentiment based on words spoken by the message recipient and based on interruptions or pauses by the recipient in a real time monolog, dialog or multi-party discussion.

Process 205 may initiate this in the same ways as described herein above regarding the detection of sentiment in real time, except that as described herein above process 205 initiates recipient sentiment determination responsive to detecting that a sender has initiated message composition, so that the sender can get immediate notice of the recipient's reaction, whereas in what is now described process 205 initiates recipient sentiment determination responsive to detecting that a recipient is reacting to a received message, so that words and phrases may be stored with their associated reactions for mining 455 when a later message is composed to the same recipient. That is, using these records, a process 205 executing on a computer system of a message sender, or on a remote system communicating with the computer system of the message sender, may consider 405 a message the sender is currently composing, may identify 410 a selected recipient of the current message, and may compare 455 the current message to stored records of past message transactions of the selected recipient for the current message. That is, for progressive comparison, as the current message is composed, e.g., word-by-word, n-words-by-n-words, or phrase-by-phrase, etc., message portions are automatically compared to stored, historical transactions of the identified earlier recipient, i.e., instead of progressively sending 440 the message portions to the earlier recipient, as was described herein above. The comparison 455 of a message portion to the stored, historical transactions of the identified recipient is to identify a past reaction of the expressive recipient to the same message portion in a past message, or at least a substantially similar message portion. (A "same message portion" refers to a word or combination of words that are the same. A "substantially similar message portion" refers to a synonymous word or word combination.) This past reaction is then fed 420 back to the sender, so that the sender's choice may be received 425 and used to modify 430 the message portion as described herein below.

Likewise, in connection with storing 415, process 205 may organize stored records of progressive sending and sentiments of respective earlier recipients that process 205 has determined are associated with particular words and phrases. For example, process 205 may organize the stored records into specific mappings, wherein in a set of words or phrases that have similar meaning, some of the words or phrases are assigned negative sentiment and some are assigned positive sentiment, which may be based on past. For example, in a set of words <tolerance, accept, inclusive, awareness>, "tolerance" may be assigned negative sentiment, whereas "accept," "inclusive" and "awareness" may be assigned positive sentiment. In another example, in a set of words <donor fatigue, monetary constraint>, "donor fatigue" may be assigned negative sentiment and "monetary constraint" may be assigned positive sentiment.

Further, stored records may be indexed by date, so that matches may be made for sentiment that was determined within a particular time frame. This may be useful, for example, in case the appearance of a selected early recipient changed over time, such as where the person had a beard a month ago, but no longer does.

An approval interface process 205 executing on a sender's computer system or a remote system may identify and select 410 early recipients, such as expressive users, for example, by detecting actions of users that are markers for sentiment, which may include auditory and visual actions, such as described herein above regarding detecting sentiment in reaction to a particular message.

Process 205 may identify expressive users from among a set of candidates. That is, for example, to identify expressive users, process 205 may analyze users limited to those who are explicitly indicated by the sender in the message as recipients or indicated by a process of setting up the message, such as a process of configuring chat participants where the message is a chat message, for example.

Alternatively, process 205 may identify candidates by analyzing users who are a target audience (i.e., target recipients) for the message, such as where the message is a posting, tweet or the like on a social network. In such a case, the process may receive a designation from the sender that indicates the target recipients as persons connected to the sender in the sender's social network profile, such as any one or more of followers, friends, family, group, community and first degree connections, second degree connections, third degree connections, etc., for example. Alternatively, or in addition, the process may automatically designate the target recipients as persons, groups or communities who are mentioned in the message or to whom the message is explicitly directed, such as by use of "@[person's, group's or community's name]" in the message.

Alternatively, or in addition, process 205 may compare the message as it is being composed to previous messages that the sender has posted, tweeted or the like and determine previous such messages that are similar in terms of subject matter, such as, for example, based on keyword matching. Then the computer system process may determine who responded to those previous messages, e.g., posted comments, retweeted, private messaged, etc., and may designate them as target recipients of the current message for determining an expressive user from among the target recipients.

Alternatively, or in addition, the computer system process may designate the target recipients based on "#" hashtags in the message that are associated with any one or more of persons, groups and communities.

For a message that a sender is currently composing, process 205 may have identified candidates to be early recipients, such as expressive users, before the sender began composing the message, according to an embodiment of the present invention, and may have identified candidates more generally, even before the sender identified recipients for the message in an embodiment. Alternatively, while the sender is composing the current message, the process may first identify one or more early recipients as candidates for the message, where the one or more candidates are among recipients indicated by the sender. In any event, regardless of whether expressive users were identified before composing or addressing began or whether they were identified after that, the process selects at least one earlier recipient who is/are recipient(s) of the message and whom the process identifies (or has already identified) as a candidate, such as because the candidate is an expressive user, for example.

In addition to computer system process 205 automatically notifying the sender about detected reaction of an expressive recipient, process 205 may prompt the sender to change one or more words of the message when the process detects the one or more words have caused an adverse reaction in the expressive recipient, which may be based on detecting either a current or past reaction to a current usage. Consequently, by prompting the sender to make changes the process may cause the message to be modified in order to obtain a more nearly optimal reaction from all the message recipients. Further, the process may suggest specific changes for the sender. In order to suggest specific changes, the process determines what changes are indicated by the detected reaction of the expressive recipient.

According to an embodiment of the present invention, computer system process 205 has, or has access to, stored sets of words and phrases having similar meanings, where it uses the alternatives in a set to suggest specific changes in response to the detected reaction of the early recipient. Such a set of words and phrases that have similar meanings may be configured with rankings to indicate an order for the computer system process to suggest them. For example, the following set of words may be stored with pointers as indicated: tolerance=>acceptance=>consent=> . . . . When the sender uses the word "tolerance" and the computer system process detects a negative reaction from the expressive recipient in response to this word, the computer system process automatically suggests to the sender the next word after "tolerance" in this ranked set of words, i.e., "acceptance." If the sender selects "acceptance" and a negative reaction is again received from the earlier recipient in response to this alternative word, the computer system process automatically suggests to the sender the next word after "acceptance" in this ranked set of words, i.e., "consent," and so on.

As previously described herein, process 205 categorizes 405 each message by extracting content from the message and analyzing the content, according to an embodiment of the present invention. This may include determining a context specific usage for the message, also known as a personality, such as formal, informal, technical, legal, marketing, humorous, etc. Accordingly, the stored sets of words and phrases described herein immediately above may be in sets corresponding to these contexts/personalities, so that when process 205 presents suggested words based on sentiment of an early recipient process 205 may select a set of words to suggest according to the category that was determined 405 for the message.

As previously explained, a computer system process may organize stored records of progressive sending and sentiments of respective earlier recipients that the process has detected in response to particular words and phrases. During composition of a current message, if the sender uses a word or phrase that has already been assigned negative sentiment by the currently designated early recipient in a prior, similar transaction, the computer system process may present a suggestion to the sender by progressive comparison of words and phrases without first sending the original word or phrase to the early recipient for the current message. In the example previously given, in a set of words <tolerance, accept, inclusive, awareness>, "tolerance" was assigned negative sentiment in a past transaction due to a reaction of a user who is now selected as an early recipient for the current message, whereas "accept," "inclusive" and "awareness" were assigned positive sentiment. In this case, when the sender composes the current message using the word "tolerance" and the same early recipient is selected, the computer system process may detect that "tolerance" has a negative sentiment in a stored set of words associated with the currently designated early recipient and may, accordingly, suggest "accept" instead of "tolerance," since "accept" is the first word in the set that has a positive sentiment, and may do this without having to test the current message against a current reaction of the early recipient.

For an instance such as described above for "tolerance," when there are organized, historical records in storage of progressive sending and sentiments of the currently designated expressive recipient for a message being currently composed, where computer system process 205 detects a word for which a sentiment reaction has been previously detected, process 205 may, according to an embodiment of the present invention, highlight the sentiment in a color, for example, such as green for positive sentiment and red for negative sentiment, or may otherwise present an annotation indicating the sentiment. This may include presenting, in a type-ahead fashion, for example, synonyms nearby and in response to a word or phrase the sender is currently typing. Synonyms may alternatively be presented in a dictionary fashion, for example, where the synonyms are presented in response to the sender requesting a dictionary via a command and then typing a word or phrase in a dictionary lookup field.

Even if the computer system process does not yet have organized, stored historical records of progressive sending and sentiments previously detected for a currently designated expressive recipient of a current message, the process may suggest synonyms based on stored sets of synonyms and progressive comparison of words and phrases in the message being composed. This may be done in a type-ahead fashion or in a dictionary fashion.

Example 1

For a first phase in instant messaging, the recipient is firstly John in a group chat, because computer system process 205 has determined or been initialized with information indicating that John is very expressive for sentiment, as the computer system process has determined via analysis of records of audible speech, visual images of face and body, and written text. Existing techniques in data mining are utilized to ascertain, for example, that John's actions in audio, facial and other factors show that he is most expressive in terms of sentiment Processing takes into account visual/auditory events that denote that the first phrase/content has a specific sentiment for John, such as the following, for example:
Input detected by computer process->Sentiment inferred by computer process
(John) audio: a long pause->likely negative (such as disbelief)

(John) visual: looking upwards->likely negative (such as dis-belief)

Processing may include drawing a heat map of recent content/interactions and matching those against other known patterns with discernible/significant sentiment scores.

In response to computer system process 205 detecting, e.g., receiving notification, that negative sentiment exceeds a threshold, process 205 presents a next word from an alternative word queue. For example, process 205 receives notification that John shows disbelief responsive to the word "acceptance," such as may be remotely detected responsive to John's facial expression, so process 205 ascertains that "acceptance" should NOT be used for communication with the rest of the message recipients.

The user interface may look like the following to the sender, for example:

In response to message typed by Bob: acceptance is alive and well

In response to reaction from John: inclusivity is alive and well

Note: the other participants in the group chat see just "inclusivity is alive and well." This advantageously provides near real-time understanding and management of sentiment.

Example 2

Figure 5:
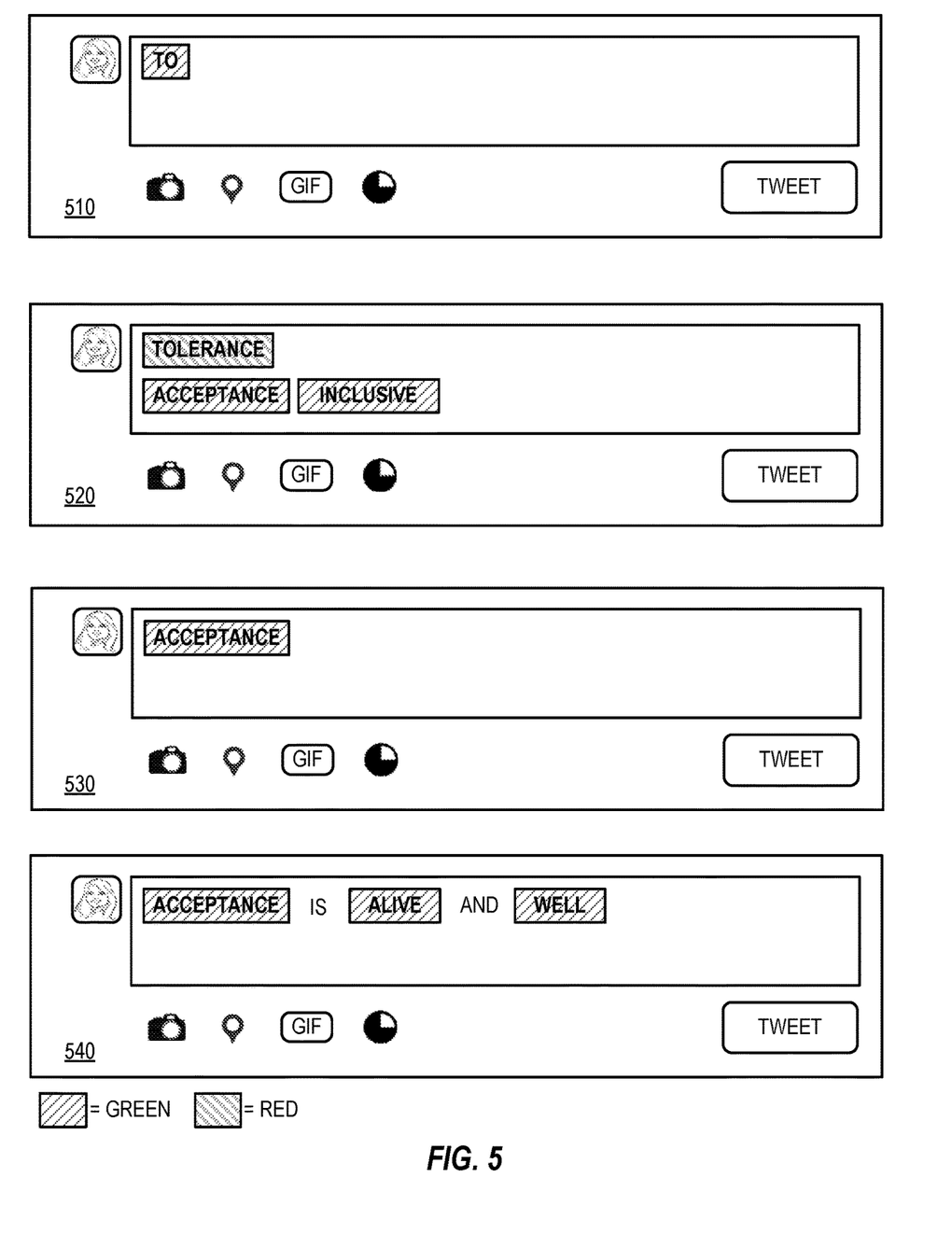
FIG. 5 illustrates an example of message composition, with prompts and modification, according to embodiments of the present invention.

Referring now to FIG. 5, a series of windows are shown illustrating a message composition sequence. Bob is a member of an online social network such as Facebook, Twitter, IBM Connections, etc. The example shown is for a Tweet but may serve to illustrate other types of messages.

Bob starts typing a message to users who are identified in a group of his social network, such as Twitter followers, for example, wherein Bob types "To" at the beginning of the message in window 510. Computer system process 205 detects "To" and immediately analyzes the group's sentiment for past messages that start with these two letters. In this instance, positive sentiment exists for "To," so process 205 does not present any corresponding modifications for the phrase.

Bob continues and finishes typing "Tolerance" as the first word of the message in window 520. Process 205 detects this word and analyzes the group's sentiment of past messages that start with this word, such as in a manner as described herein above. In this instance, process 205 determines negative sentiment and, therefore, presents the word "Tolerance" in red, while also presenting alternative words "Acceptance" and "Inclusive" that have similar meaning and that have had high acceptance by the group in past messages. Consequently, Bob modifies his message by selecting "Acceptance" in window 530. In response to Bob's notice to process 205 that he has selected this word, process 205 indicates positive sentiment in window 530 by highlighting the selected word "acceptance" in green.

In this fashion, the computer system process proceeds letter-by-letter, word-by-word or phrase-by-phrase (or a combination of letter-by-letter, word-by-word and phrase-by-phrase, which may include them all) to analyze and signal past sentiment for each word and/or phrase Bob types, present alternatives, etc. Accordingly, Bob finishes his message, as shown in window 540, with appropriate substitutions and tweets a final version of the message, which is well received by his community of followers.

It should be appreciated that a computer system configured for query processing as described herein above provides a specialized computing device specifically configured to implement the mechanisms of the illustrative embodiments and is not a general purpose computing device. Moreover, the implementation of the mechanisms of the illustrative embodiments, as described, improves the functionality of the computing device and provides a useful and concrete result that reduces the resource cost of query processing, including concatenation for hash arrays.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and application modules that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

From the foregoing, it should be appreciated that embodiments of the present invention provide numerous advantageous features. For example, embodiments of the present invention provide for monitoring of communications in a social networking system to associate terms, such as words and phrases, with a sentiment and a level of expression of the sentiment by readers of the communications to form a predictive sentiment level model. Embodiments of the present invention provide for analyzing a construction of a current communication prepared by a sender to send to one or more recipients according to the predictive sentiment level model to form a current sentiment assessment. Embodiments of the present invention provide for analyzing the current sentiment assessment against a predicted negative sentiment threshold. Embodiments of the present invention enable performing a first modification of a first message portion to facilitate a positive sentiment for the modified message responsive to identifying that a negative sentiment for a first recipient exceeds a threshold. The identifying may be accomplished, in part, by sending the first message portion to the first recipient before sending the modified message to other recipients. A second message portion may, likewise, be sent to an early recipient for identifying sentiment before sending the final message, where the sending of the second message portion may be to the same, first recipient or to a different one of the message recipients.

Those skilled in the art having read this disclosure will recognize that changes and modifications may be made to the embodiments without departing from the scope of the present invention. It should be appreciated that operation of features described herein may be turned on or off by the sender.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Herein the term "multi-recipient" is used. It should be understood that this may refer to merely two recipients in one instance and more than two in another instance.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer system implemented method for multi-recipient message modification, comprising:
    detecting, by the computer system, that a sender is composing a current message, wherein the current message is designated for delivery via a computer network to recipients once the current message is completed;
    selecting, by the computer system, a particular one of the recipients as an early recipient based on records of reactions associated with historical records for past messages of the recipients;
    finding, by the computer system, prior to sending the current message to the recipients other than the early recipient, a historical record of the early recipient that matches a portion of the current message;
    presenting to the sender, by the computer system prior to the computer system sending the current message to the recipients other than the early recipient, a reaction indication based on a record of reaction associated with the historical record of the early recipient that matches the current message portion;
    receiving, by the computer system after the computer system presents the indication to the sender and prior to the computer system sending the current message to the recipients other than the early recipient, a modification from the sender for the current message portion;
    generating a modified message portion by the computer system applying the received modification to the current message portion prior to the computer system sending the current message to the recipients other than the early recipient; and
    sending, by the computer system, the current message to all the recipients, wherein the sending of the current message to all the recipients includes sending the modified message portion and occurs after applying the received modification to the current message portion.

2. The method of claim 1, wherein the presenting the indication of the reaction comprises:
    presenting to the sender an alternative word for a word in the current message portion.

3. The method of claim 1, wherein the past messages include written messages and audible messages.

4. The method of claim 1, wherein the presenting the indication comprises:

presenting a category selected from at least the categories of anger, disgust, fear, happiness, neutral, sadness, and surprise.

5. The method of claim 1, comprising:
associating reactions with the historical records for the respective past messages based on the computer system detecting physical reactions to the past messages of the past message recipients.

6. The method of claim 5, wherein the physical reactions include facial expressions detected by a camera of the computer system.

7. The method of claim 5, wherein the physical reactions include audible reactions detected by a microphone of the computer system.

8. A system for multi-recipient message modification, the system comprising:
a processor; and
a computer readable storage medium connected to the processor, where the computer readable storage medium has recorded thereon a program for controlling the processor, and where the processor is operative with the program to execute the program for:
detecting, by the computer system, that a sender is composing a current message, wherein the current message is designated for delivery via a computer network to recipients once the current message is completed;
selecting, by the computer system, a particular one of the recipients as an early recipient based on records of reactions associated with historical records for past messages of the recipients;
finding, by the computer system, prior to sending the current message to the recipients other than the early recipient, a historical record of the early recipient that matches a portion of the current message;
presenting to the sender, by the computer system prior to the computer system sending the current message to the recipients other than the early recipient, a reaction indication based on a record of reaction associated with the historical record of the early recipient that matches the current message portion;
receiving, by the computer system after the computer system presents the indication to the sender and prior to the computer system sending the current message to the recipients other than the early recipient, a modification from the sender for the current message portion;
generating a modified message portion by the computer system applying the received modification to the current message portion prior to the computer system sending the current message to the recipients other than the early recipient; and
sending, by the computer system, the current message to all the recipients, wherein the sending of the current message to all the recipients includes sending the modified message portion and occurs after applying the received modification to the current message portion.

9. The system of claim 8, wherein the presenting the indication of the reaction comprises:
presenting to the sender an alternative word for a word in the current message portion.

10. The system of claim 8, wherein the past messages include written messages and audible messages.

11. The system of claim 8, wherein the presenting the indication comprises:
presenting a category selected from at least the categories of anger, disgust, fear, happiness, neutral, sadness, and surprise.

12. The system of claim 11, wherein the processor is operative with the program to execute the program for:
associating reactions with the historical records for the respective past messages based on the computer system detecting physical reactions to the past messages of the past message recipients.

13. The system of claim 11, wherein the physical reactions include facial expressions detected by a camera of the computer system.

14. The system of claim 11, wherein the physical reactions include audible reactions detected by a microphone of the computer system.

15. A computer program product for multi-recipient message modification, including a computer readable storage medium having instructions stored thereon for execution by a computer system, where the instructions, when executed by the computer system, cause the computer system to implement a method comprising:
detecting, by the computer system, that a sender is composing a current message, wherein the current message is designated for delivery via a computer network to recipients once the current message is completed;
selecting, by the computer system, a particular one of the recipients as an early recipient based on records of reactions associated with historical records for past messages of the recipients;
finding, by the computer system, prior to sending the current message to the recipients other than the early recipient, a historical record of the early recipient that matches a portion of the current message;
presenting to the sender, by the computer system prior to the computer system sending the current message to the recipients other than the early recipient, a reaction indication based on a record of reaction associated with the historical record of the early recipient that matches the current message portion;
receiving, by the computer system after the computer system presents the indication to the sender and prior to the computer system sending the current message to the recipients other than the early recipient, a modification from the sender for the current message portion;
generating a modified message portion by the computer system applying the received modification to the current message portion prior to the computer system sending the current message to the recipients other than the early recipient; and
sending, by the computer system, the current message to all the recipients, wherein the sending of the current message to all the recipients includes sending the modified message portion and occurs after applying the received modification to the current message portion.

16. The computer program product of claim 15, wherein the presenting the indication of the reaction comprises:
presenting to the sender an alternative word for a word in the current message portion.

17. The computer program product of claim 15, wherein the past messages include written messages and audible messages.

18. The computer program product of claim 15, wherein the presenting the indication comprises:
presenting a category selected from at least the categories of anger, disgust, fear, happiness, neutral, sadness, and surprise.

19. The computer program product of claim 18, wherein the instructions, when executed by the computer system, cause the computer system to implement a method comprising:

associating reactions with the historical records for the respective past messages based on the computer system detecting physical reactions to the past messages of the past message recipients.

20. The computer program product of claim 19, wherein the physical reactions include facial expressions detected by a camera of the computer system.

* * * * *